UNITED STATES PATENT OFFICE.

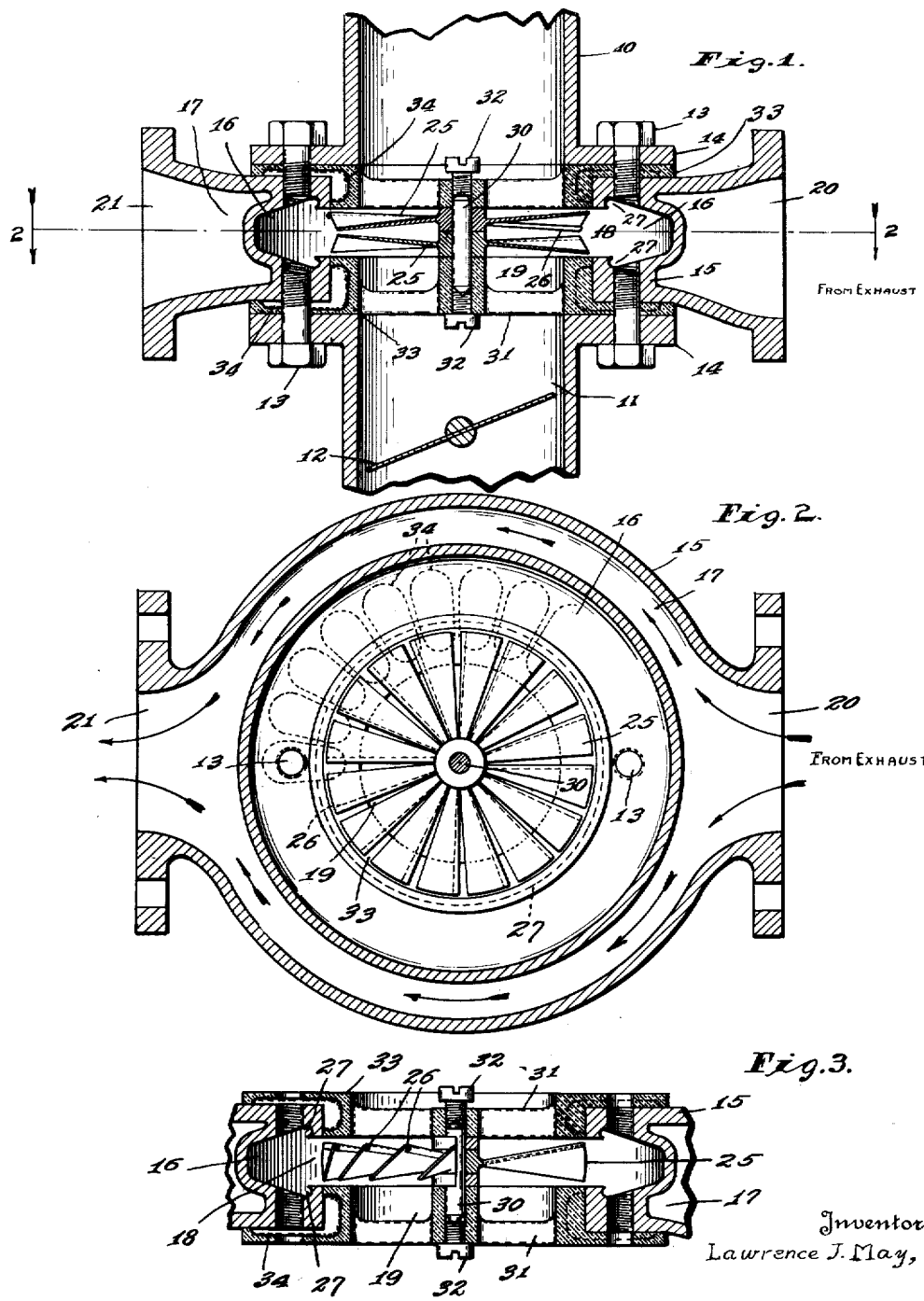

LAURENCE J. MAY, OF INDIANAPOLIS, INDIANA, ASSIGNOR TO CHARLES E. SARGENT, OF ROCK ISLAND, ILLINOIS.

GASIFIER.

1,420,616.  Specification of Letters Patent.  Patented June 20, 1922.

Application filed May 2, 1921. Serial No. 465,966.

*To all whom it may concern:*

Be it known that I, LAURENCE J. MAY, a citizen of the United States, residing at Indianapolis, in the county of Marion and State of Indiana, have invented a new and useful Gasifier, of which the following is a specification.

In the operation of internal combustion engines with low grade fuel, it is becoming more and more necessary to heat the fuel as the quality of the fuel decreases; and it is advantageous to do this after the fuel has been discharged into the air, and yet not to heat the air.

It is the object of my present invention to provide a simple device for doing this, which device can readily be inserted between any carbureter and intake manifold without requiring any special construction of either.

The accompanying drawings illustrate my invention: Fig. 1 is a vertical central section through a device embodying my invention, with fragments of the associated carbureter and intake manifold; Fig. 2 is a section on the line 2—2 of Fig. 1; and Fig. 3 is a fragmentary vertical central section, similar to Fig. 1, of a modified form of my invention, using but a single wind wheel.

My device is preferably inserted between the inlet pipe 10 of the intake manifold and the outlet pipe 11 of the carbureter which supplies such intake manifold, both of these being of any desired construction, and the carbureter having the usual throttle 12. I make this insertion of my device by bolting it by bolts 13 to the attaching flanges 14 of the intake manifold and the carbureter.

My device has an annular member 15, which is bolted to the flanges 14 by the bolts 13, and in this annular member 15 there are inner and outer annular chambers 16 and 17, conveniently concentric. The inner annular chamber 16 opens inwardly, by a circumferential passage 18, to the central air passage 19 by which the air and fuel pass from the carbureter outlet 11 through my device to the inlet 10 of the intake manifold. The outer annular chamber 17 is provided with opposite inlet and exhaust ports 20 and 21, by which such chamber is connected in the exhaust passageway from the associated internal combustion engine so that the hot exhaust gases will pass through such outer chamber 17 and thus heat the inner annular chamber 16. This connection of the exhaust passageway 17 may be anything desired, and is not illustrated in detail.

Mounted in the passage 19 are one or more wind wheels 25. In the form shown in Fig. 1 there are two such wind wheels, with their blades oppositely skewed so that the two wind wheels rotate in opposite directions by the action of the stream of air thereon. In the arrangement shown in Fig. 3 there is only a single wind wheel. The wind wheel or wind wheels 25 are coaxial with the passage 19, and are in the transverse plane of the inward opening 18 from the annular chamber 16. The passing stream of air from the carbureter through the passage 19 causes the wind wheel or wind wheels 25 to rotate rapidly, and the blades of the wind wheel or wind wheels strike the particles of fuel in this stream of air and throw such fuel outward into the annular chamber 16. To assist in throwing this fuel outward, the rear edges of the blades of the wind wheel or wind wheels 25 are provided with downwardly opening troughs 26, which collect the fuel caught by their respective blades and permit such fuel to escape only by the action of centrifugal force at the outer ends of such troughs 26 and into the chamber 16. The fuel which is thus thrown outward into the chamber 16 is heated by the hot gases passing through the outer chamber 17, and the gas formed from this fuel passes back through the opening 18 into the central passageway 19, where it mixes with the air and passes on to the intake manifold, while further liquid is being thrown out by the wind wheel or wind wheels 25 into the chamber 16. The chamber 16 at the inner part thereof is wider than the opening 18 and is preferably provided both above and below, so that the unit may be inserted either side up, with annular troughs 27, in the lower of which the fuel in the chamber 16 collects, so that the fuel in liquid form is thus prevented from flowing back from the chamber 16 into the passage 19.

The wind wheel or wind wheels 25 are mounted on a central supporting pin 30, which is supported in spiders 31 on suitable supporting screws 32. When there is only one wind wheel, it may be fast to the pin 30, so that the pin rotates; but if there are two or more wind wheels, rotating in opposite directions, as illustrated in Fig. 1, not more than one of such wind wheels, and not necessarily even one, is fastened to the pin 30, so that the pin 30 may or may not rotate. The spiders 31 are carried by and are conveniently integral with rings 33 which are inserted between the flanges 14 and the annular member 15, and these may extend along the inner edge of such annular member to the opening 18, as illustrated. The rings 33 are preferably made of heat-insulating material, so that the transfer of heat from the annular member 15 to the carbureter 11 and to the intake manifold 10 may be minimized; and in practice, in order further to lessen this heat transfer, I prefer to cut away the rings 33 so that they touch the annular member 15 only in spots and at the ends of their cooperating surfaces, and thus to leave heat-insulating air spaces 34 between the annular member 15 and the rings 33 throughout the greater part of their adjacent faces.

I claim as my invention:

1. In combination, a member provided with a passage through which explosive mixture may be supplied to an internal combustion engine, said member being provided with an annular chamber surrounding such passage, one or more wind wheels mounted in such passage and arranged to be rotated by the passing stream of fluid therethrough, said wind wheel or wind wheels being arranged to discharge by centrifugal force into such chamber the fuel caught by their blades, and means for heating such chamber.

2. In combination, a member provided with a passage through which explosive mixture may be supplied to an internal combustion engine, said member being provided with a chamber, one or more wind wheels mounted in such passage and arranged to be rotated by the passing stream of fluid therethrough, said wind wheel or wind wheels being arranged to discharge by centrifugal force into such chamber the fuel caught by their blades, and means for heating such chamber above the temperature of the adjacent parts of said passage.

3. In combination, a member provided with a passage through which explosive mixture may be supplied to an internal combustion engine, said member being provided with an annular chamber surrounding such passage, one or more wind wheels mounted in such passage and arranged to be rotated by the passing stream of fluid therethrough, said wind wheel or wind wheels being arranged to discharge by centrifugal force into such chamber fuel caught by their blades, said member being provided with an outer annular chamber surrounding and in heat-transferring relationship to said first chamber and arranged to be connected to carry exhaust gases from the associated engine.

4. In combination, a member provided with a passage through which explosive mixture may be supplied to an internal combustion engine, said member being provided with a chamber, one or more wind wheels mounted in such passage and arranged to be rotated by the passing stream of fluid therethrough, said wind wheel or wind wheels being arranged to discharge by centrifugal force into such chamber the fuel caught by their blades, said member being provided with a second chamber in heat-transferring relationship to said first chamber and arranged to be connected to carry exhaust gases from the associated engine.

5. In combination, a member provided with a passage through which explosive mixture may be supplied to an internal combustion engine, said member being provided with a chamber, one or more wind wheels mounted in such passage and arranged to be rotated by the passing stream of fluid therethrough, said wind wheel or wind wheels being arranged to discharge by centrifugal force into such chamber the fuel caught by their blades, and means for heating such chamber, the rear edges of blades of said wind wheel or wind wheels being provided with troughs opening toward the intake side of said passage to catch the liquid fuel in the stream of explosive mixture and prevent such liquid fuel from passing off of said blades save at the outer ends of said troughs.

6. In combination, a member provided with a passage through which explosive mixture may be supplied to an internal combustion engine, said member being provided with a chamber, one or more wind wheels mounted in such passage and arranged to be rotated by the passing stream of fluid therethrough, said wind wheel or wind wheels being arranged to discharge by centrifugal force into such chamber the fuel caught by their blades, and means for heating such chamber, the outlet of said chamber to said passage being arranged to prevent back flow of liquid from the chamber to the passage.

7. A member provided with a passage through which explosive mixture may be supplied to an internal combustion engine, said member being provided with a chamber, one or more wind wheels mounted in such passage and arranged to be rotated by the passing stream of fluid therethrough, said wind wheel or wind wheels being arranged to discharge by centrifugal force into such chamber the fuel caught by their blades, means for heating such chamber, in combination with the attaching flanges of an intake manifold and a carbureter, and rings of heat-insulating material between said member and said attaching flanges.

8. A member provided with a passage through which explosive mixture may be supplied to an internal combustion engine, said member being provided with a chamber, one or more wind wheels mounted in such passage and arranged to be rotated by the passing stream of fluid therethrough, said wind wheel or wind wheels being arranged to discharge by centrifugal force into such chamber the fuel caught by their blades, means for heating such chamber, in combination with the attaching flanges of an intake manifold and a carbureter, and rings of heat-insulating material between said member and said attaching flanges, said rings lining the passage through such member save at the outlet from said chamber.

9. A member provided with a passage through which explosive mixture may be supplied to an internal combustion engine, said member being provided with a chamber, one or more wind wheels mounted in such passage and arranged to be rotated by the passing stream of fluid therethrough, said wind wheel or wind wheels being arranged to discharge by centrifugal force into such chamber the fuel caught by their blades, means for heating such chamber, in combination with the attaching flanges of an intake manifold and a carbureter, and rings of heat-insulating material between said member and said attaching flanges, said rings being arranged to engage one of their associated parts in spots and to be spaced from such associated part elsewhere on such cooperating surfaces to provide heat-insulating air spaces.

10. A member provided with a passage through which explosive mixture may be supplied to an internal combustion engine, said member being provided with a chamber, one or more wind wheels mounted in such passage and arranged to be rotated by the passing stream of fluid therethrough, said wind wheel or wind wheels being arranged to discharge by centrifugal force into such chamber the fuel caught by their blades, and means for heating such chamber, in combination with the attaching flanges of an intake manifold and a carbureter, rings between said member and said attaching flanges, said rings being provided with supporting spiders, and means for carrying said wind wheel or wind wheels on said spiders.

11. In combination, a conduit for carrying an explosive mixture from a carbureter to an internal combustion engine, a windwheel rotatably mounted in said conduit and having outwardly projecting blades, and a chamber surrounding said conduit and opening into said conduit in the plane of said blades, said blades being provided with oblique portions for causing rotation of the wind-wheel and with troughs opening against the direction of stream flow for catching non-gaseous matter which strikes the blades and discharging such non-gaseous matter into said chamber, and means for heating said chamber by the exhaust gas from the engine.

In witness whereof, I have hereunto set my hand at Indianapolis, Indiana, this 19th day of April, A. D. one thousand nine hundred and twenty one.

LAURENCE J. MAY.

Certificate of Correction.

It is hereby certified that in Letters Patent No. 1,420,616, granted June 20, 1922, for an improvement in "Gasifiers," the name of the patentee in the printed specification is erroneously written and printed as "Laurence J. May," whereas said name should have been written and printed as *Lawrence J. May;* and that the said Letters Patent should be read with this correction therein that the same may conform to the record of the case in the Patent Office.

Signed and sealed this 18th day of July, A. D., 1922.

[SEAL.]
KARL FENNING,
*Acting Commissioner of Patents.*